(12) United States Patent
Hackett

(10) Patent No.: US 8,726,884 B2
(45) Date of Patent: May 20, 2014

(54) QUILL ASSEMBLY FOR A DUAL FUEL COMMON RAIL FUEL SYSTEM

(75) Inventor: David Elliot Hackett, Washington, IL (US)

(73) Assignee: Caterpillar Inc., Peoria, IL (US)

(*) Notice: Subject to any disclaimer, the term of this patent is extended or adjusted under 35 U.S.C. 154(b) by 541 days.

(21) Appl. No.: 13/111,067

(22) Filed: May 19, 2011

(65) Prior Publication Data

US 2012/0291752 A1 Nov. 22, 2012

(51) Int. Cl.
*F02M 1/00* (2006.01)

(52) U.S. Cl.
USPC .................................. 123/456; 123/468

(58) Field of Classification Search
CPC ........................... F02M 55/015; F02M 69/465
USPC ........................ 123/456, 468, 469, 470, 304
See application file for complete search history.

(56) References Cited

U.S. PATENT DOCUMENTS

| | | | |
|---|---|---|---|
| 4,596,271 A * | 6/1986 | Brundage | 137/540 |
| 4,834,198 A * | 5/1989 | Thompson | 175/244 |
| 5,022,501 A * | 6/1991 | Hayashi et al. | 188/300 |
| 5,458,292 A | 10/1995 | Hapeman | |
| 6,073,862 A | 6/2000 | Touchette et al. | |
| 6,298,833 B1 | 10/2001 | Douville et al. | |
| 6,702,072 B2 * | 3/2004 | Asano | 188/170 |
| 6,827,065 B2 * | 12/2004 | Gottemoller et al. | 123/456 |
| 8,522,752 B2 * | 9/2013 | Kim et al. | 123/468 |
| 2005/0166899 A1 | 8/2005 | Shamine et al. | |

FOREIGN PATENT DOCUMENTS

CA 2 635 410 10/2008

* cited by examiner

*Primary Examiner* — John Kwon
(74) *Attorney, Agent, or Firm* — Miller, Matthias & Hull

(57) ABSTRACT

A quill assembly includes a first quill tube and a second quill tube nested within the first quill tube. A first compression assembly includes a first piston operably coupled to the first quill tube and fluidly communicates with the first fuel rail to apply a first piston axial force against the first quill tube inlet end, and a first spring operably coupled to the first piston and configured to apply a first spring axial force against the first quill tube inlet end. A second compression assembly includes a second piston operably coupled to the second quill tube inlet end and fluidly communicates with the second fuel rail to apply a second piston axial force against the second quill tube inlet end, and a second spring operably coupled to the second piston and configured to apply a second spring axial force against the second quill tube inlet end.

17 Claims, 3 Drawing Sheets

US 8,726,884 B2

QUILL ASSEMBLY FOR A DUAL FUEL COMMON RAIL FUEL SYSTEM

TECHNICAL FIELD

The present disclosure generally relates to dual fuel common rail systems and, more particularly, to a quill assembly for use in such systems.

BACKGROUND

Diesel engines are used in a wide variety of industrial applications. Common rail fuel systems are often used to deliver fuel to the engines and are generally known in the art of compression engines. Such systems use a fuel, such as distillate diesel fuel or heavy fuel oil, which ignites when placed under compression in a combustion chamber of the engine. A typical common rail fuel system includes a common fuel rail that supplies fuel injectors for an engine via quill tubes. Because of the high pressures involved, some jurisdictions require a double wall containment strategy for capturing leaked fuel. For instance, co-owned U.S. Patent Application Publication No. 2005/0166899 to Shamine et al. discloses a high pressure line connection strategy for fluidly connecting a common rail to fuel injectors.

Many industrial applications where compression engines are used would benefit environmentally and economically from use of gaseous fuels, such as natural gas, as the engine fuel. Natural gas is generally readily available and tends to be more economical. Additionally, combustion of gaseous fuels may reduce the production of undesirable emissions, including NOx, unburned hydrocarbons, and the like, thereby relaxing demands on aftertreatment systems. Furthermore, engines burning gaseous fuel generally have fewer maintenance problems.

While the use of gaseous fuel may provide the above advantages, gaseous fuel typically requires a much higher temperature to reach auto ignition than diesel fuel. Accordingly, some gaseous fuel engines include a spark plug. Other engines may use a small amount of distillate diesel fuel as a pilot fuel that is compression ignited to in turn ignite a larger charge of gaseous fuel, which is the primary fuel. Fuel systems that use both a compression fuel and a gaseous fuel are known as "dual fuel" systems.

Dual fuel systems typically require separate fuel paths into the combustion chamber of the engine. Canadian Patent 2,635,410, for example, teaches a dual fuel connector that relies upon a single quill that includes two different internal passages to facilitate fluid connection to two different fuel inlets of a fuel injector. This type of dual fuel connector has drawbacks because, at a minimum, the reference fails to teach an effective strategy for inhibiting fuel leakage. Alternatively, a coaxial quill assembly may be used to deliver the two fuels to the fuel injector, in which a first fuel path is defined by an inner quill and a second fuel path is defined by an annular space formed between the inner quill and an outer quill.

One challenge with the use of coaxial quill assemblies is to prevent leaks in the two fuel paths. An axial sealing load may be applied to each quill, thereby to seal the ends of the quill with abutting components. Because of the relative quantities, pressures, and properties of the primary fuel and the pilot fuel, the sealing load required for each quill may be different. Additionally, the engine may have different modes of operation that change the desired operating pressures of the fuels, and therefore the required sealing load for a given quill may change depending on the engine mode of operation. Accordingly, it is desirable to provide a quill assembly that adequately seals the quills while addressing the different fuel pressures and modes of operation in a duel fuel engine.

SUMMARY OF THE DISCLOSURE

According to certain aspects of this disclosure, a quill assembly is provided for a dual fuel common rail fuel system having a first fuel rail and a second fuel rail. The quill assembly includes a first quill tube having a first quill tube inlet end and a first quill tube outlet end and defining a first quill tube inner wall. A second quill tube is nested within the first quill tube, the second quill tube having a second quill tube inlet end and a second quill tube outlet end and defining a second quill tube inner wall and a second quill tube outer wall. An outer conduit is formed between the first quill tube inner wall and the second quill tube outer wall, the outer conduit fluidly communicating with the first fuel rail. An inner conduit is defined by the second quill tube inner wall and fluidly communicating with the second fuel rail. A first compression assembly includes a first piston operably coupled to the first quill tube inlet end and fluidly communicating with the first fuel rail to apply a first piston axial force against the first quill tube inlet end, and a first spring operably coupled to the first piston and configured to apply a first spring axial force against the first quill tube inlet end. A second compression assembly includes a second piston operably coupled to the second quill tube inlet end and fluidly communicating with the second fuel rail to apply a second piston axial force against the second quill tube inlet end, and a second spring operably coupled to the second piston and configured to apply a second spring axial force against the second quill tube inlet end.

In another aspect of the disclosure that may be combined with any of these aspects, apparatus is provided for use with a dual fuel common rail fuel system having a first fuel rail and a second fuel rail. The apparatus includes an engine cylinder head defining an injector bore and a quill bore, and a fuel injector disposed in the injector bore and including a first fuel injection passage and a second fuel injection passage. A first quill tube is disposed in the quill bore and has a first quill tube inlet end and a first quill tube outlet end and defining a first quill tube inner wall. A second quill tube is nested within the first quill tube, the second quill tube having a second quill tube inlet end and a second quill tube outlet end and defining a second quill tube inner wall and a second quill tube outer wall. An outer conduit is formed between the first quill tube inner wall and the second quill tube outer wall, the outer conduit having an outer conduit inlet end fluidly communicating with the first fuel rail and an outer conduit outlet end fluidly communicating with the first fuel injection passage of the fuel injector. An inner conduit is defined by the second quill tube inner wall, the inner conduit including an inner conduit inlet end fluidly communicating with the second fuel rail and an inner conduit outlet end fluidly communicating with the second fuel injection passage of the fuel injector. A first compression assembly includes a first piston operably coupled to the first quill tube inlet end and fluidly communicating with the first fuel rail to apply a first piston axial force against the first quill tube inlet end, and a first spring operably coupled to the first piston and configured to apply a first spring axial force against the first quill tube inlet end. A second compression assembly includes a second piston operably coupled to the second quill tube inlet end and fluidly communicating with the second fuel rail to apply a second piston axial force against the second quill tube inlet end, and a second spring operably coupled to the second piston and configured to apply a second spring axial force against the second quill tube inlet end.

In another aspect of the disclosure that may be combined with any of these aspects, a housing may define a first chamber fluidly communicating with the first fuel rail and a second chamber fluidly communicating with the second fuel rail.

In another aspect of the disclosure that may be combined with any of these aspects, the first piston may include a first piston face disposed in the first chamber and the second piston may include a second piston face disposed in the second chamber.

In another aspect of the disclosure that may be combined with any of these aspects, the housing further includes a central aperture extending from the first chamber to the second chamber, and the second piston extends through the central aperture.

In another aspect of the disclosure that may be combined with any of these aspects, a first seal assembly extends between the housing and the first piston and a second seal assembly extends between the housing and the second piston.

In another aspect of the disclosure that may be combined with any of these aspects, the second piston defines an internal passage fluidly communicating between the second chamber and the inner conduit.

In another aspect of the disclosure that may be combined with any of these aspects, the first quill tube inlet end includes a first quill seat surface and the first piston includes a first piston mating surface configured to sealingly engage the first quill seat surface, thereby to form a first quill tube inlet seal between the first piston and the first quill tube inlet end extending around the outer conduit, and the second quill tube inlet end includes a second quill seat surface and the second piston includes a second piston mating surface configured to sealingly engage the second quill seat surface, thereby to form a second quill tube inlet seal between the second piston and the second quill tube inlet end extending around the inner conduit.

In another aspect of the disclosure that may be combined with any of these aspects, the first piston axial force varies directly with a first fuel pressure in the first fuel rail, and the second piston axial force varies directly with a second fuel pressure in the second fuel rail.

DETAILED DESCRIPTION

Exemplary embodiments of a quill assembly are disclosed herein for use with an engine having a dual fuel common rail fuel system. The quill assembly includes coaxial inner and outer quills, with a first fuel path defined by the inner quill and a second fuel path defined by the annular space between the inner and outer quills. Outlet ends of the quills are received in respective seats formed in a fuel injector, while independently acting compression assemblies engage respective inlet ends of the quills. Each compression assembly includes a piston that contacts the quill inlet end and that fluidly communicates with a respective one of the dual fuels to apply a piston axial force against the associated quill tube inlet end. Each compression assembly further includes a spring operably coupled to the piston and configured to apply a spring axial force against the associated quill tube inlet end. Accordingly, the spring applies a relatively constant initial sealing force to the associated quill tube while the piston applies an additional sealing force that varies with the pressure of the associated fuel, so that the compression assembly adequately seals the associated quill tube under any operating condition.

Figure 1:
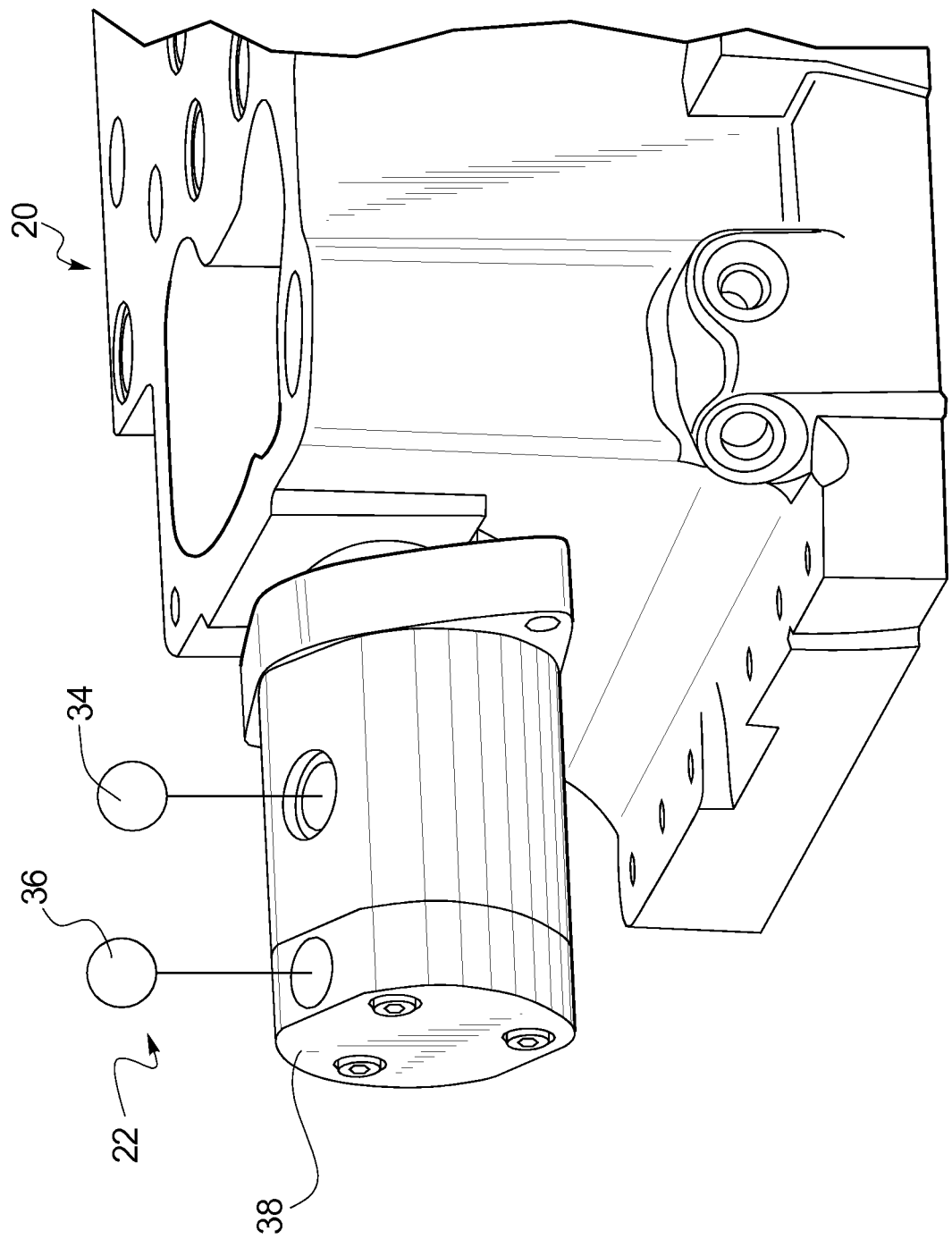
FIG. 1 is a perspective view of a portion of an engine cylinder head having a quill assembly coupled thereto.
Figure 2:
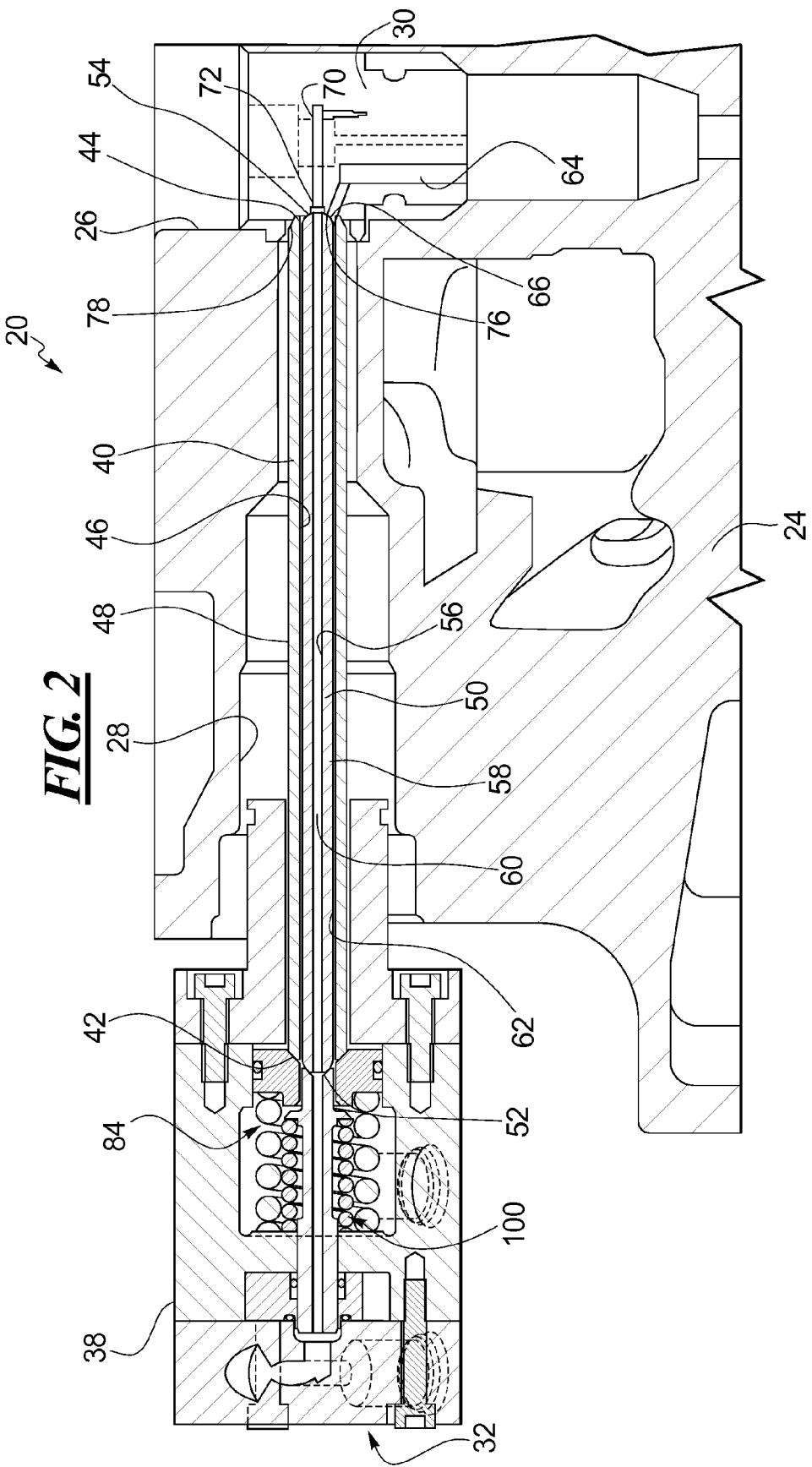
FIG. 2 is a side elevation view, in cross-section, of the quill assembly of FIG. 1 coupled to the engine cylinder head.

While the following detailed description and drawings are made with reference to an engine 20 used in a mining or construction vehicle, the teachings of this disclosure may be employed on other types of vehicles or in standalone engines used in various power generation applications. Referring to FIGS. 1 and 2, a portion of the engine 20 is shown having a dual fuel common rail system 22 supplying two different fuels to the engine 20. The engine 20 includes an engine cylinder head 24 defining multiple combustion chambers (not shown). As best shown in FIG. 2, the engine cylinder head 24 includes an injector bore 26 and a quill bore 28. A fuel injector 30 is disposed in the injector bore 26, while a quill assembly 32 is disposed in the quill bore 28.

The dual fuel common rail system 22 includes a first common rail 34 and a second common rail 36. The first common rail 34 provides a first fuel at a desired pressure or range of pressures, while the second common rail 36 provides a second fuel at a desired pressure or range of pressures. The first and second fuels may be different. While the concepts of the present disclosure may apply to a variety of fuels for different types of engines, in the exemplary embodiments disclosed herein the first fuel may be a gaseous fuel such as natural gas, while the second fuel may be a compression fuel such as distillate diesel fuel. In other words, the engine 20 associated with the dual fuel common rail system 22 may initially compression ignite a smaller charge of distillate diesel fuel from the second common rail 36, while primarily burning a larger charge of liquefied natural gas supplied from the first common rail 34. Herein, for the purposes of illustrating the teachings of the disclosure, the term "fuel" means any liquid or gaseous fluid that may be combusted in a compression ignition engine. Such fuels may include, but are not limited to, natural gas, diesel, and the like.

Figure 3:
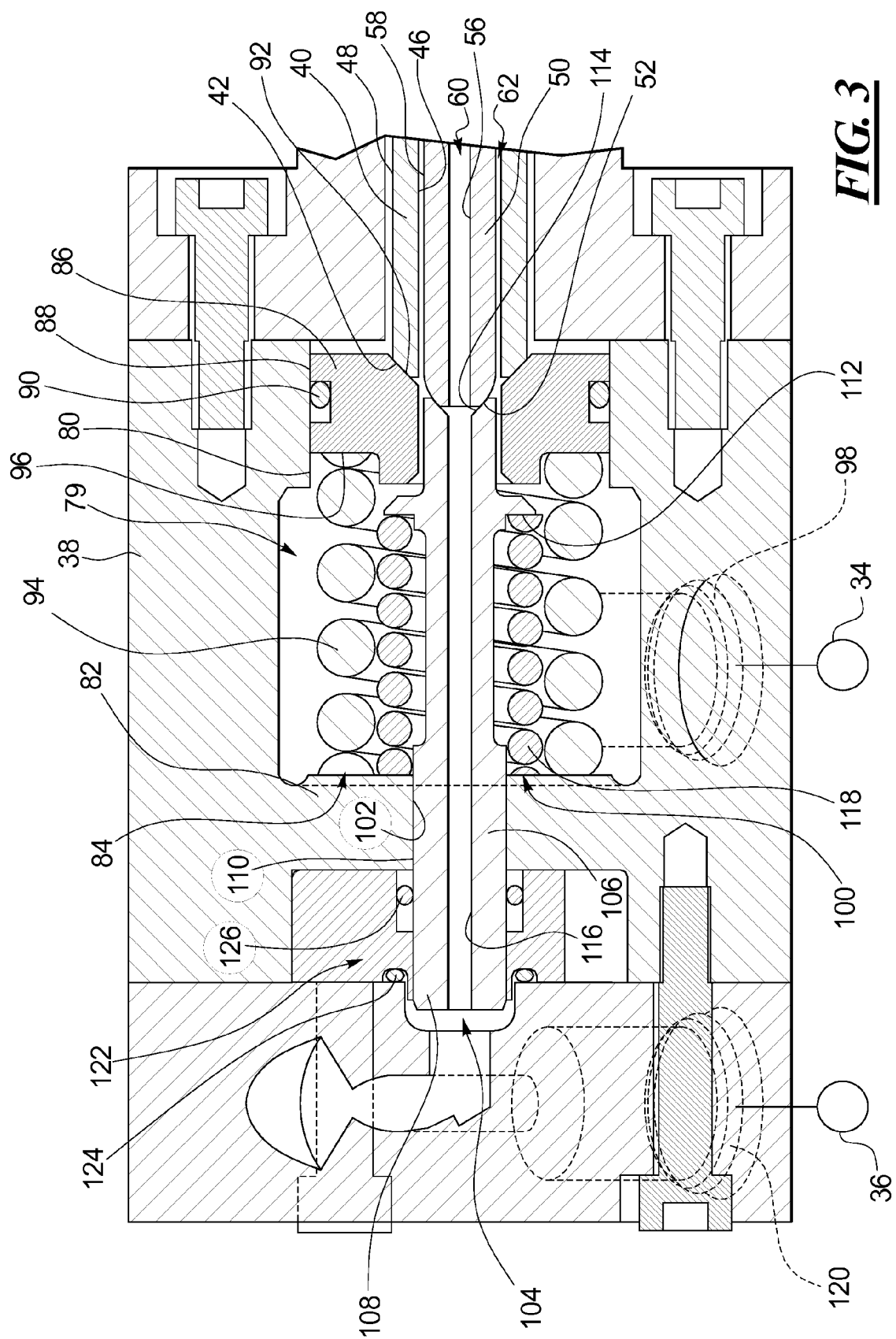
FIG. 3 is an enlarged side elevation view, in cross-section, of a portion of the quill assembly of FIG. 2.

The quill assembly 32 is provided to fluidly communicate the fuels from the first and second common rails 34, 36 to the fuel injector 30. As best shown in FIGS. 2 and 3, a distal end of the quill assembly 32 is inserted into the quill bore 28 of the engine cylinder head 24. A housing 38 is coupled to the engine cylinder head 24 and encloses a proximal end of the quill assembly 32. The quill assembly 32 includes a first or outer quill tube 40 having a first quill tube inlet end 42 and a first quill tube outlet end 44. The first quill tube defines a first quill tube inner wall 46 and a first quill tube outer wall 48. The quill assembly 32 also includes a second or inner quill tube 50 nested within the first quill tube 40. The second quill tube 50 includes a second quill tube inlet end 52 and a second quill tube outlet end 54, and defines a second quill tube inner wall 56 and a second quill tube outer wall 58. An inner conduit 60 is defined by the second quill tube inner wall 56, while an outer conduit 62 is formed by the annular space between the first quill tube inner wall 46 and the second quill tube outer wall 58.

The outlet ends 44, 54 of the first and second quill tubes 40, 50 are configured to sealingly engage respective seats formed in the fuel injector 30, thereby to permit selective discharge into the combustion chamber. As best shown in FIG. 2, the fuel injector 30 includes a first fuel injection passage 64 extending between a first passage inlet 66 and a first passage outlet (not shown). The fuel injector 30 also includes a second fuel injection passage 70 extending between a second passage inlet 72 and a second passage outlet (not shown). The first passage outlet and second passage outlet are positioned to discharge fuel into the combustion chamber. The first passage inlet 66 defines a first fuel injection seat 76, while the second passage inlet 72 defines a second fuel injection seat 78. The first quill tube outlet end 44 abuts the first fuel injection seat 76 to form a first quill tube outlet seal therebetween that extends around the outer conduit 62. The second quill tube outlet end 54 abuts the second fuel injection seat 78 to form a second quill tube outlet seal therebetween that extends around the inner conduit 60. The outlet ends 44, 54 and seats 76, 78 may be configured to sealingly engage each other. In an exemplary embodiment, the outlet ends 44, 54 may be rounded or conical and the seats 76, 78 may also be rounded or conical to more reliably form a sealing engagement therebetween.

Compression assemblies are operatively coupled to the first and second quill tubes 40, 50 to further ensure that they sealingly engage the first and second fuel injection seats 76, 78, respectively. As best shown in FIG. 3, the housing 38 defines a first chamber 79 extending between first bore 80 and an intermediate wall 82 which fluidly communicates with the outer conduit 62. A first compression assembly 84 is disposed in the first chamber 79 and includes a first piston 86 having an outer wall 88 that closely fits the first bore 80. An outer seal 90, such as an O-ring, is provided between the outer wall 88 and the first bore 80. The first piston 86 may include a conical seat 92 that sealingly engages the first quill tube inlet end 42. A first spring 94 extends between a spring seat 96 of the first piston 86 and the intermediate wall 82 of the housing 38, thereby to generate a first spring axial force against the first quill tube inlet end 42. The housing 38 further defines a first inlet 98 that fluidly communicates with the first common rail 34. Accordingly, the first chamber 79 receives the first fuel at a first fuel pressure that is applied against the cross-sectional area of the first piston 86, thereby to apply a first piston axial force against the first quill tube inlet end 42. The first spring axial force and the first piston axial force ensure that the piston seat 92 sealingly engages the first quill tube inlet end 42 and that the first quill tube outlet end 44 sealingly engages the first fuel injection seat 76.

A second compression assembly 100 is also disposed in the housing 38 for sealing the second quill tube 50. As best shown in FIG. 3, the intermediate wall 82 defines a central aperture 102 and the housing further defines a second chamber 104. The second compression assembly 100 includes a second piston 106 having an inlet face 108, a body portion 110 extending through and closely fitting the central aperture 102, a spring seat 112, and an outlet end 114 configured to sealingly engage the second quill tube inlet end 52. The second piston 106 defines a central passage 116 fluidly communicating between the second chamber 104 and the inner conduit 60. The second compression assembly 100 further includes a second spring 118 extending between the intermediate wall 82 and the spring seat 112 to generate a second spring axial force against the second quill tube inlet end 52. The housing further defines a second inlet 120 that fluidly couples the second common rail 36 to the second chamber 104. Accordingly, the second chamber 104 receives the second fuel at a second fuel pressure that is applied against the cross-sectional area of the inlet face 108, thereby to apply a second piston axial force against the second quill tube inlet end 52. The second spring axial force and the second piston axial force ensure that the outlet end 114 sealingly engages the second quill tube inlet end 52 and that the second quill tube outlet end 54 sealingly engages the second fuel injection seat 78. A seal assembly 122 is provided in the second chamber 104 and may include a face seal 124 disposed between the second piston 106 and the housing 38 and a radial seal 126 disposed between the second piston 106 and the intermediate wall 82.

INDUSTRIAL APPLICABILITY

The quill assembly 32 of the present disclosure may be used in any engine that utilizes two fuels in the combustion space of an associated engine. These two fuels may be the same fuel at two different pressures, or two different fuels as described in the illustrated embodiment. Although the present disclosure could apply to spark ignited engines utilizing appropriate fuels, the present disclosure finds particular applicability in gaseous fuel engines that use a relatively large charge of natural gas that is ignited via compression ignition of a small charge of distillate diesel fuel originating from the second common rail 36.

In the exemplary embodiments, a duel quill arrangement is utilized in which a second quill tube 50 is nested inside a first quill tube 40. A first fuel may flow through the outer conduit 62 defined between the first and second quill tubes 40, 50 and a second fuel may flow through the inner conduit 60 defined by the second quill tube 50. Each juncture (at the inlet and outlet ends of the quill tubes) where fuel enters or exits the quill tubes must be sealed with enough sealing contact force to retard or prevent leaking. Moreover, each such juncture for the first fuel may require a sealing contact force of a different value than each such juncture for the second fuel. The present disclosure may find applicability in providing a design that distributes the appropriate sealing contact forces to the junctures at the first and second ends of the outer and inner quill tubes in order to inhibit or prevent leaking of the fuels.

More specifically, compression assemblies 84, 100 operably engage the first and second quill tubes 40, 50 to provide an axial sealing force at each juncture. The first compression assembly 84 operably engages the first quill tube 40 and provides a substantially constant first spring axial force and a variable first piston axial force. The first piston axial force varies directly with the operating pressure of the first fuel provided by the first common rail 34. Similarly, the second compression assembly 100 operatively engages the second quill tube 50 and provides a substantially constant second spring axial force and a variable second piston axial force. The second piston axial force varies directly with the operating pressure of the second fuel provided by the second common rail 36.

It will be appreciated that the sealing forces provided by the first and second compression assemblies 84, 100 may be different. As noted above, the actual sealing force provided by a compression assembly is at least partially dependent on the operating pressure of the associated fuel. Accordingly, if the two fuels are provided at different operating pressures, the sealing forces applied by the first and second compression assemblies 84, 100 may be different.

Furthermore, it will be appreciated that the sealing forces provided by the first and second compression assemblies 84, 100 automatically adjust to provide an adequate amount of sealing force for the operating pressure of the fuels. Again, as noted above, the piston axial force generated by the compression assembly varies directly with the fuel operating pressure. Accordingly, when the fuel pressure increases, the piston axial force also increases to provide additional axial sealing force. Conversely, when the fuel pressure decreases, the piston axial force decreases to reduce the amount of axial sealing force applied to the associated quill tube.

The features disclosed herein may be particularly beneficial to a stand-alone engine or an engine used in an earth moving, construction, or mining vehicle where two fuels are provided to the combustion chamber of the engine. The present description is for illustrative purposes only, and should not be construed to narrow the breadth of the present disclosure in any way. Thus, those skilled in the art will appreciate that various modifications might be made to the presently disclosed embodiments without departing from the full and fair scope of the present disclosure. Other aspects, features, and advantages will be apparent upon an examination of the attached drawings and appended claims.

What is claimed is:

1. A quill assembly for a dual fuel common rail fuel system having a first fuel rail and a second fuel rail, the quill assembly comprising:
   a first quill tube having a first quill tube inlet end and a first quill tube outlet end and defining a first quill tube inner wall;
   a second quill tube nested within the first quill tube, the second quill tube having a second quill tube inlet end and a second quill tube outlet end and defining a second quill tube inner wall and a second quill tube outer wall;
   an outer conduit formed between the first quill tube inner wall and the second quill tube outer wall, the outer conduit fluidly communicating with the first fuel rail;
   an inner conduit defined by the second quill tube inner wall and fluidly communicating with the second fuel rail;
   a first compression assembly including:
      a first piston operably coupled to the first quill tube inlet end and fluidly communicating with the first fuel rail to apply a first piston axial force against the first quill tube inlet end; and
      a first spring operably coupled to the first piston and configured to apply a first spring axial force against the first quill tube inlet end; and
   a second compression assembly including:
      a second piston operably coupled to the second quill tube inlet end and fluidly communicating with the second fuel rail to apply a second piston axial force against the second quill tube inlet end; and
      a second spring operably coupled to the second piston and configured to apply a second spring axial force against the second quill tube inlet end.

2. The quill assembly of claim 1, further comprising a housing defining a first chamber fluidly communicating with the first fuel rail and a second chamber fluidly communicating with the second fuel rail.

3. The quill assembly of claim 2, in which the first piston includes a first piston face disposed in the first chamber and the second piston includes a second piston face disposed in the second chamber.

4. The quill assembly of claim 2, in which the housing further includes a central aperture extending from the first chamber to the second chamber, and in which the second piston extends through the central aperture.

5. The quill assembly of claim 4, further comprising a first seal assembly extending between the housing and the first piston and a second seal assembly extending between the housing and the second piston.

6. The quill assembly of claim 2, in which the second piston defines an internal passage fluidly communicating between the second chamber and the inner conduit.

7. The quill assembly of claim 1, in which:
   the first quill tube inlet end includes a first quill seat surface and the first piston includes a first piston mating surface configured to sealingly engage the first quill seat surface, thereby to form a first quill tube inlet seal between the first piston and the first quill tube inlet end extending around the outer conduit; and
   the second quill tube inlet end includes a second quill seat surface and the second piston includes a second piston mating surface configured to sealingly engage the second quill seat surface, thereby to form a second quill tube inlet seal between the second piston and the second quill tube inlet end extending around the inner conduit.

8. The quill assembly of claim 1, in which the first piston axial force varies directly with a first fuel pressure in the first fuel rail, and in which the second piston axial force varies directly with a second fuel pressure in the second fuel rail.

9. Apparatus for use with a dual fuel common rail fuel system having a first fuel rail and a second fuel rail, the apparatus comprising:
   an engine cylinder head defining an injector bore and a quill bore;
   a fuel injector disposed in the injector bore and including a first fuel injection passage and a second fuel injection passage;
   a first quill tube disposed in the quill bore and having a first quill tube inlet end and a first quill tube outlet end and defining a first quill tube inner wall;
   a second quill tube nested within the first quill tube, the second quill tube having a second quill tube inlet end and a second quill tube outlet end and defining a second quill tube inner wall and a second quill tube outer wall;
   an outer conduit formed between the first quill tube inner wall and the second quill tube outer wall, the outer conduit having an outer conduit inlet end fluidly communicating with the first fuel rail and an outer conduit outlet end fluidly communicating with the first fuel injection passage of the fuel injector;
   an inner conduit defined by the second quill tube inner wall, the inner conduit including an inner conduit inlet end fluidly communicating with the second fuel rail and an inner conduit outlet end fluidly communicating with the second fuel injection passage of the fuel injector;
   a first compression assembly including:
      a first piston operably coupled to the first quill tube inlet end and fluidly communicating with the first fuel rail to apply a first piston axial force against the first quill tube inlet end; and
      a first spring operably coupled to the first piston and configured to apply a first spring axial force against the first quill tube inlet end; and
   a second compression assembly including:
      a second piston operably coupled to the second quill tube inlet end and fluidly communicating with the second fuel rail to apply a second piston axial force against the second quill tube inlet end; and
      a second spring operably coupled to the second piston and configured to apply a second spring axial force against the second quill tube inlet end.

10. The apparatus of claim 9, in which:
   the first fuel injection passage includes a first fuel injection passage inlet end defining a first fuel injection seat, and the first quill tube outlet end is configured to sealingly engage the first fuel injection seat thereby to form a first quill tube outlet seal between the first quill tube outlet end and the first fuel injection seat extending around the outer conduit; and
   the second fuel injection passage includes a second fuel injection passage inlet end defining a second fuel injection seat, and the second quill tube outlet end is configured to sealingly engage the second fuel injection seat thereby to form a second quill tube outlet seal between the second quill tube outlet end and the second fuel injection seat extending around in the inner conduit.

11. The apparatus of claim 9, further comprising a housing coupled to the engine cylinder head and defining a first chamber fluidly communicating with the first fuel rail and a second chamber fluidly communicating with the second fuel rail.

12. The apparatus of claim 11, in which the first piston includes a first piston face disposed in the first chamber and the second piston includes a second piston face disposed in the second chamber.

13. The apparatus of claim 11, in which the housing further includes a central aperture extending from the first chamber to the second chamber, and in which the second piston extends through the central aperture.

14. The apparatus of claim 13, further comprising a first seal assembly extending between the housing and the first piston and a second seal assembly extending between the housing and the second piston.

15. The apparatus of claim 11, in which the second piston defines an internal passage fluidly communicating between the second chamber and the inner conduit.

16. The apparatus of claim 9, in which:
the first quill tube inlet end includes a first quill seat surface and the first piston includes a first piston mating surface configured to sealingly engage the first quill seat surface, thereby to form a first quill tube inlet seal between the first piston and the first quill tube inlet end extending around the outer conduit; and
the second quill tube inlet end includes a second quill seat surface and the second piston includes a second piston mating surface configured to sealingly engage the second quill seat surface, thereby to form a second quill tube inlet seal between the second piston and the second quill tube inlet end extending around the inner conduit.

17. The apparatus of claim 9, in which the first piston axial force varies directly with a first fuel pressure in the first fuel rail, and in which the second piston axial force varies directly with a second fuel pressure in the second fuel rail.

* * * * *